United States Patent [19]

Sato

[11] Patent Number: 5,078,146

[45] Date of Patent: Jan. 7, 1992

[54] ULTRASONIC DIAGNOSIS APPARATUS

[75] Inventor: Ichiro Sato, Tochigi, Japan

[73] Assignee: Kabushiki Kaisha Toshiba, Kawasaki, Japan

[21] Appl. No.: 578,605

[22] Filed: Sep. 7, 1990

[30] Foreign Application Priority Data

Sep. 8, 1989 [JP] Japan ................... 1-231406

[51] Int. Cl.$^5$ ............................................. A61B 8/06
[52] U.S. Cl. ......................... 128/661.08; 128/661.09; 128/660.05
[58] Field of Search ...................... 128/661.08, 661.09, 128/662.01, 660.05

[56] References Cited

U.S. PATENT DOCUMENTS

| 4,888,694 | 12/1989 | Chesarek | 364/413.24 |
|---|---|---|---|
| 4,911,171 | 3/1990 | Uchibori | 128/661.09 |
| 4,918,605 | 4/1990 | Shirasaka | 128/661.09 |
| 4,930,514 | 6/1990 | Baba et al. | 128/661.09 |
| 4,966,151 | 10/1990 | Takeuchi | 128/661.09 |
| 4,993,417 | 2/1991 | Seo | 128/661.09 |
| 5,014,710 | 5/1991 | Masiak et al. | 128/660.05 |

Primary Examiner—Francis Jaworski
Assistant Examiner—George Manuel
Attorney, Agent, or Firm—Finnegan, Henderson, Farabow, Garrett, and Dunner

[57] ABSTRACT

A B-mode Doppler flow mapping apparatus includes a transducer for radiating an ultrasonic wave to an object, and receiving an ultrasonic wave reflected by the object, a scanning circuit for controlling the transducer to change a radiation direction of the ultra-sonic wave in such a manner that a given slice of the object is scanned by the ultrasonic waves while the ultrasonic waves are repeatedly radiated n (n≧2) number of times, each repetition being after the completion of a given number of radiations, a B-mode processor for obtaining a tomographic image of the slice by detecting the intensity of the ultrasonic waves received, and a color mapping processor for detecting a Doppler shift frequency of the ultrasonic wave received, and performing a color display of a blood flow in the tomographic image in accordance with the Doppler shift frequency. The apparatus includes a manual operating member for a designating an approximate flow rate of a blood flow in the slice, and a control circuit for controlling the scanning circuit in accordance with the flow rate designated by the manual operating member and changing the given number of radiations so as to change a sampling frequency for detecting a Doppler shift frequency, and to set optimal upper and lower limits of detectable Doppler shift frequencies.

12 Claims, 5 Drawing Sheets

| MODE | SCANNING SEQUENCE |
|---|---|
| MODE 1 (HIGH RATE) | 1, 1, 1, 1, 2, 2, 2, 2, 3, 3, 3, 3, 4, 4, 4, 4, 5, 5, 5, ... |
| MODE 2 (MEDIUM) | 1, 2, 1, 2, 1, 2, 3, 4, 3, 4, 3, 4, 5, 6, 5, 6, 5, ... |
| MODE 3 (LOW RATE) | 1, 2, 3, 1, 2, 3, 1, 2, 3, 4, 5, 6, 4, 5, 6, 4, ... |

ULTRASONIC DIAGNOSIS APPARATUS

BACKGROUND OF THE INVENTION

1. Field of the Invention

The present invention relates to an ultrasonic diagnosis apparatus for scanning a slice of an object to be examined with an ultrasonic wave and detecting a frequency change in the reflected ultrasonic wave (Doppler shift) so as to detect the direction and flow rate of a blood flow within the slice.

2. Description of the Related Art

As one of such ultrasonic diagnosis apparatuses, a B-mode Doppler flow-mapping (to be referred to as BDF) apparatus is available. The BDF apparatus is designed to output a color display of a blood flow image included in a tomographic image (B-mode image) in accordance with a blood flow direction and a blood flow rate. In this apparatus, an ultrasonic wave is radiated a plurality of times n ($n \geq 2$) in each radiation direction (i.e., a scanning line or raster), a change in phase of each reflected ultrasonic wave with respect to a corresponding previous reflected ultrasonic wave is detected, the phase changes are averaged to obtain a Doppler shift frequency, and the Doppler shift frequency at each point on the scanning line is calculated. At the same time, the ultrasonic radiation direction is changed, and a predetermined slice is scanned by the ultrasonic wave. A tomographic image is obtained from the intensity of the scanned ultrasonic wave, and the Doppler shift frequency is color-displayed on the tomographic image. In general, a flow direction to toward an ultrasonic transducer probe is colored in red, a flow direction from the probe is colored in blue, and a disturbed flow is colored in green. In addition, a flow rate is represented by the saturation of a color. By using such a BDF apparatus, an abnormal state of a blood flow such as a regurgitation, a constriction, or a shunt can be observed in real-time.

Principles of Doppler shift detection will be described below. When an ultrasonic wave is radiated on blood flowing in a living body, the ultrasonic wave is scattered by flowing blood cells and the frequency fo of the ultrasonic wave is subjected to a Doppler shift so as to be changed by a frequency fd. Therefore, the frequency f of the received ultrasonic wave is given by $f = fo + fd$. In this case, the frequencies fo and fd have the following relationship:

$$fd = 2V \cdot \cos \theta \cdot fo / C \qquad (1)$$

where V is the blood flow rate, $\theta$ is the angle defined by the ultrasonic wave and the blood vessel, and C is the ultrasound velocity.

Accordingly, the blood flow rate V can be obtained by detecting the Doppler shift frequency fd.

There are upper and lower limits of detectable Doppler shift frequencies, and hence upper and lower limits of detectable blood flow rates are present. In the BDF apparatus, an ultrasonic wave is radiated at a predetermined rate, wherein the repetitive rate frequency fr of the ultrasonic wave is equal to a sampling frequency. Therefore, the detectable Doppler shift frequency fd is limited according to the sampling theorem as follows:

$$fd \leq fr/2 \qquad (2)$$

Therefore, the upper limit $V_{max}$ of measurable flow rate can be represented as follows:

$$V_{max} = C \cdot fr / (4 \cos \theta \cdot fo) \qquad (3)$$

A frequency exceeding the upper limit fr/2 is detected as being decreased by fr. In a BDF image, a blood flow rate exceeding the upper limit is displayed with its flow direction being reversed. In addition, when frequency analysis of a received ultrasonic wave is performed by a fast Fourier transform (FFT), and the analyzed resulting waveform is to be displayed, a portion exceeding fr/2 is shifted downward by fr, and a so-called aliasing phenomenon occurs.

Furthermore, the lower limit of measurable flow rate is limited by a data length to be fetched. If a data length to be fetched (a length of sampling on each scanning line) is represented by T, and a data number (the number of times of irradiation of an ultrasonic wave in the same direction) is represented by n, a lower limit $fd_{min}$ of detectable frequency can be given by:

$$fd_{min} = 1/T = fr/n \qquad (4)$$

$$\therefore V_{min} = C \cdot fr / (2n \cdot \cos \theta \cdot fo) \qquad (5)$$

In a BDF image, flow rates below this lower limit are displayed as achromatic portions. For this reason, a portion where a flow rate is low, e.g., a portion near the wall of the blood vessel, tends to be an achromatic portion. This degrades the resolution of the BDF image.

It is apparent from equation (5) that the lower limit of measurable flow rate can be decreased by decreasing the sampling frequency fr or increasing the data number n. However, if the sampling frequency fr is decreased, the upper limit of detectable flow rate is also decreased according to equation (3), and aliasing tends to occur. If the sampling frequency fr is decreased or the data number n is increased, image quality in the BDF apparatus is degraded for the following reason. In the BDF apparatus, the following relation is established:

$$F \cdot n \cdot m \cdot (1/fr) = 1 \qquad (6)$$

where F is a frame number, m is the total scanning line number for the B mode tomographic image, n is the above-mentioned data number, and fr is the above-mentioned rate frequency. The frame number F is the number of B-mode images per second. As the frame number F is increased, the BDF image looks more natural as a motion image. Normally, F is set to be 8 to 30. If m=32, fr=4 KHz, and n=8, F is 16. According to equation (6), if the data number n is increased or the rate frequency fr is decreased, the frame number F is decreased, and the image looks unnatural. Note that if the total scanning line number m is decreased, the resolution of the BDF image is decreased.

A technique for decreasing this lower limit of detectable flow rate is disclosed in "Method and System for controlling ultrasonic scanning sequence," U.S. patent application Ser. No. 07/423,713 filed on Oct. 18, 1989 and assigned as the present invention to the same assignee. According to this technique, instead of changing the radiation direction to an adjacent direction after an ultrasonic wave is radiated n times in each direction, the radiation direction is changed one by one after each radiation. When the radiation direction is sequentially changed from the first direction through an ith direction, the ultrasonic wave is radiated in the first direction again. When the ultrasonic wave has been radiated n times in each radiation direction, radiation is performed in the same manner as described above in directions from an (i+1)th direction to a (2i)th direction. Subsequently, this operation is repeated. With this operation, the ultrasonic wave is radiated in each radiation direction with a frequency of fr/i. That is, the sampling frequency for Doppler shift detection can be decreased without sacrificing other characteristic features In the conventional apparatus, however, the value i is arbitrarily determined by an operator, and no proper method of setting the value i has been established. As described above, the sampling frequency is changed when the value i is changed. As a result, the detectable range of Doppler shift frequency also varies. For this reason, if the value i is too large, although the lower limit is decreased, the upper limit of detectable flow rates is also decreased Hence, aliasing tends to occur. If the value i is too small, the lower limit of detectable flow rates cannot be satisfactorily decreased.

SUMMARY OF THE INVENTION

It is an object of the present invention to set an optimal detectable flow rate range in accordance with a target portion in an ultrasonic diagnosis apparatus for detecting flow by using Doppler shift.

According to the present invention, there is provided an ultrasonic diagnosis apparatus comprising transducer means for radiating an ultrasonic wave to an object, and receiving an ultrasonic wave reflected by the object; scanning means for controlling the transducer means to change a radiation direction of the ultrasonic wave in such a manner that a given slice of the object is scanned by the ultrasonic waves while the ultrasonic waves are repeatedly radiated to each direction n (n≧2) number of times, each repetition being after the completion of a given number of radiations; means for detecting a Doppler shift frequency of the ultrasonic wave received by said transducer means, and obtaining flow rate data of a blood flow within the slice in accordance with the Doppler shift frequency; and control means, having a manual operating member for designating an approximate flow rate of the blood flow within the slice, for controlling the scanning means in accordance with the designated flow rate and changing the given number of radiations to change a repetition intervals at which the ultrasonic waves are repeatedly radiated in each radiation direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
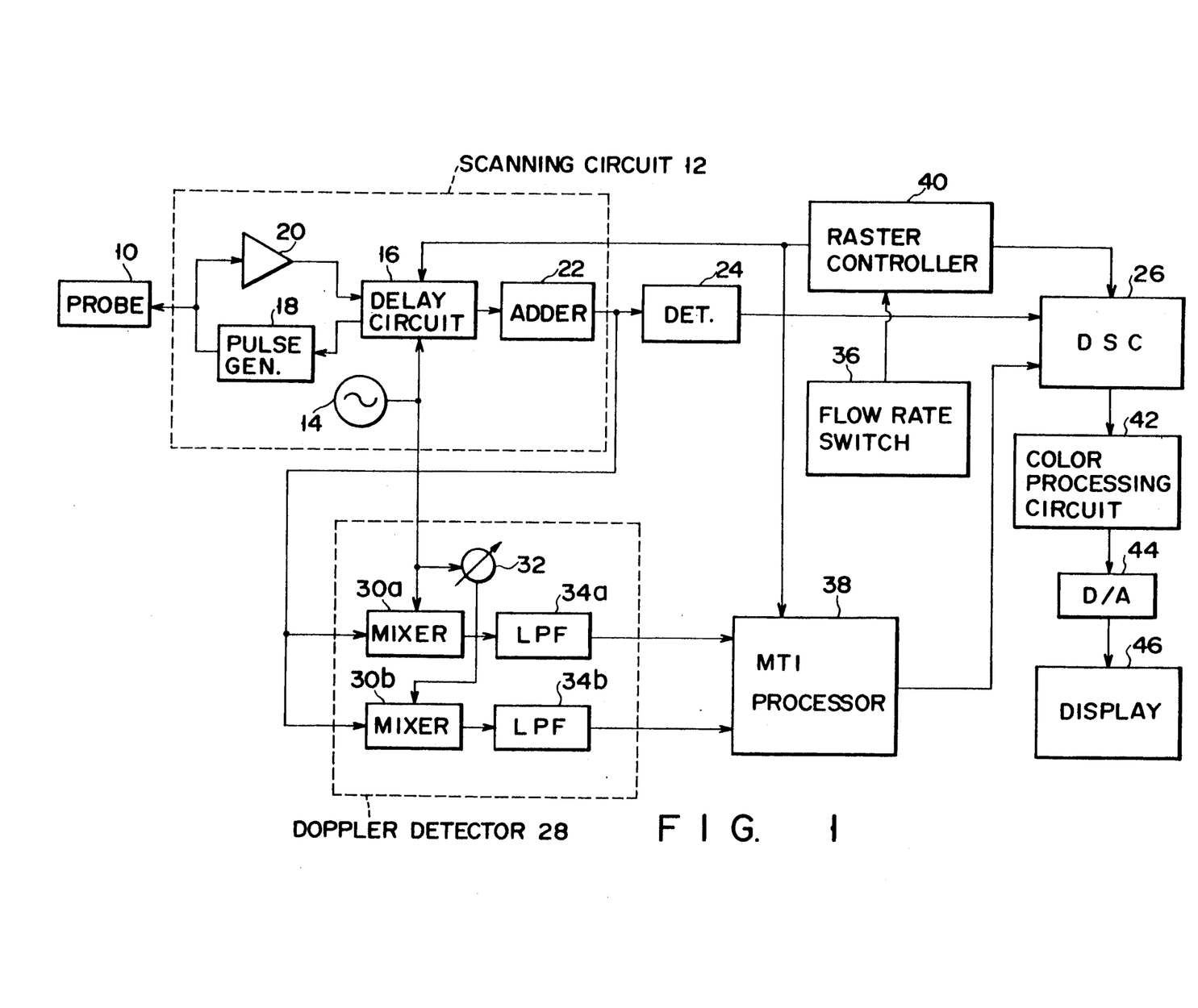
FIG. 1 is a block diagram showing an ultrasonic diagnosis apparatus according to an embodiment of the present invention.

An embodiment of an ultrasonic diagnosis apparatus according to the present invention will be described below with reference to the accompanying drawings. FIG. 1 is a block diagram showing an arrangement of the embodiment. A scanning circuit 12 is connected to an ultrasonic transducer probe 10 of an electronic sector scanning type. The probe 10 is constituted by a plurality of ultrasonic transducers arranged in a line. By changing the timing of a driving voltage to be applied to each transducer, an ultrasonic wave can be scanned in the form of a sector or can be focused. Note that the probe 10 is not limited to an electronic sector scanning type probe, but a probe of a linear scanning type or a mechanical scanning type may be used. In the scanning circuit 12, an output from an oscillator 14 for determining the frequency at which each ultrasonic transducer is vibrated is supplied to the probe 10 through a delay circuit 16 and a pulse generator 18. The pulse generator 18 supplies drive pulses to the probe 10 at a predetermined period. The reciprocal of this period is a repetitive rate frequency fr of an ultrasonic wave. The delay circuit 16 is constituted by a large number of delay lines having different delay times. Outputs from the delay lines are respectively supplied to the plurality of transducers. By changing the delay time for each transducer, the direction (raster direction) of the ultrasonic wave radiated from the probe 10 can be changed. Each delay time is controlled by a control signal from a raster controller 40.

Outputs from the probe 10 are supplied to an adder 22 through a preamplifier 20 and the delay circuit 16. The output from each transducer is supplied to the adder 22 through a corresponding delay line with the same delay time that is set for the radiation of the ultrasonic wave. An output from the adder 22 is input to an amplitude detector 24, and the intensity of the reflected wave of an ultrasonic wave in each raster direction is detected. The output from the detector 24 is input as luminance data of each raster (scanning line), i.e., B-mode image (tomographic) data, to a digital scan converter (DSC) 26. The raster of the ultrasonic probe 10 changes as does the sectorial shape. The raster of a display 46 is in the transverse direction as in a normal television scheme. Therefore, the DSC 26 serves to output an image while changing its raster direction (scanning direction).

The outputs from the adder 22 and the oscillator 14 are supplied to a Doppler detector 28. The Doppler detector 28 is a circuit for detecting a Doppler shift frequency by an orthogonal detection scheme. The Doppler detector 28 comprises mixers 30a and 30b, a 90° phase shifter 32, and low-pass filters (LPFs) 34a and 34b. An output from the adder 22 is multiplied by outputs from the oscillator 14 and the phase shifter 32 by means of the mixers 30a and 30b. Therefore, Doppler shift frequency and high-frequency component (doubled transmission frequency plus Doppler shift frequency) can be obtained from the mixers 30a and 30b. The LPFs 34a and 34b serve to remove the high-frequency components from the outputs from the mixers 30a and 30b. Outputs from the LPFs 34a and 34b are supplied as the cosine and sine components of the Doppler shift frequency. A Doppler shift frequency includes two channels i.e., cosine and sine, because this allows detection of the polarity of a shift frequency.

Figure 2:
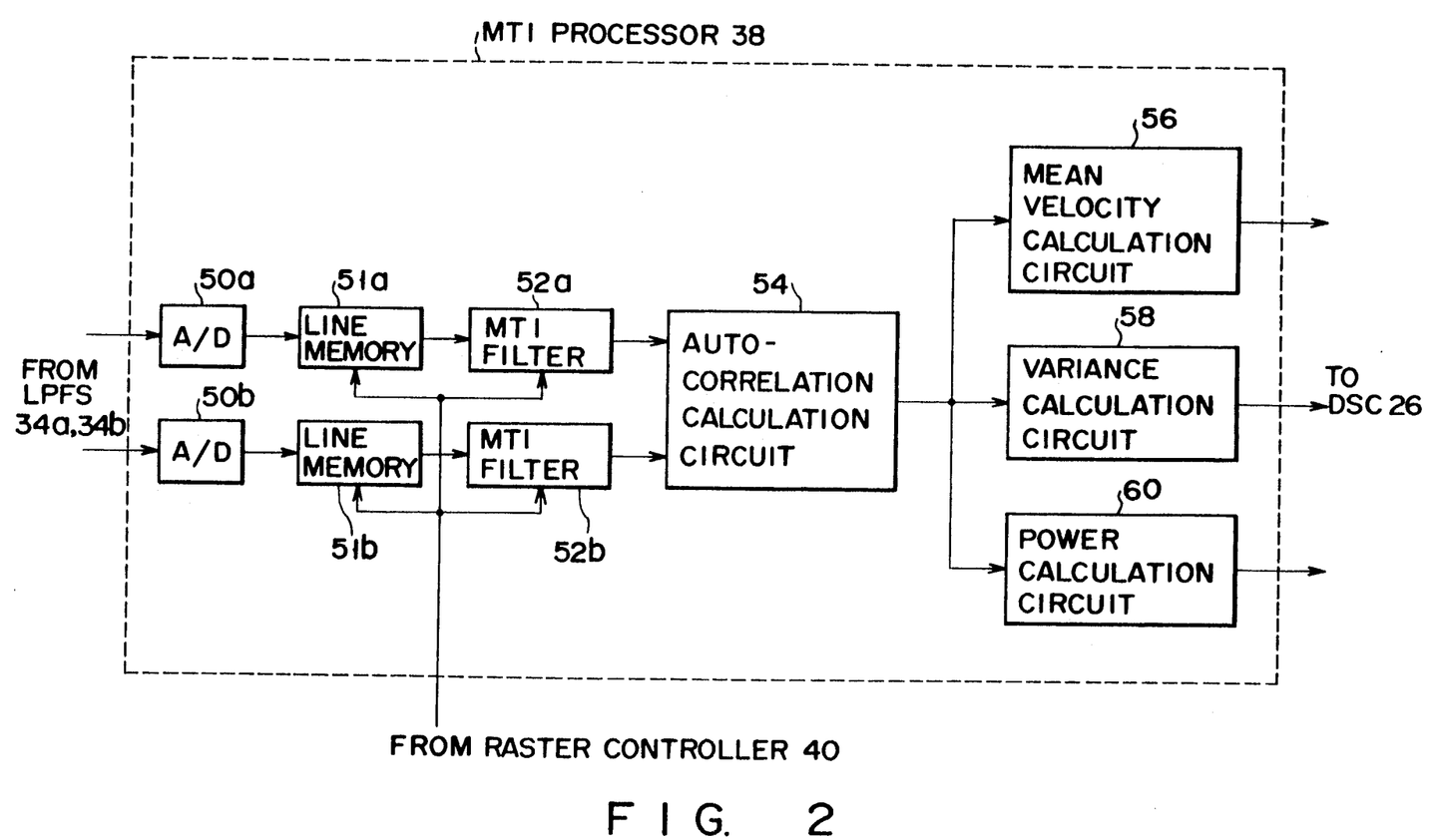
FIG. 2 is a block diagram showing a detailed arrangement of an MTI processor in FIG. 1.

The outputs from the Doppler detector 28 are supplied to an MTI (Moving Target Indicator) processor 38 for color Doppler processing (flow-mapping processing). An output from the processor 38 is also supplied to the DSC 26. A raster control signal from the raster controller 40 is also supplied to the MTI processor 38. FIG. 2 is a block diagram showing a detailed arrangement of the MTI processor 38. The outputs from the LPFs 34a and 34b are input to an auto-correlation calculation circuit 54 through A/D converters 50a and 50b, line memories 51a and 51b, and MTI filters 52a and 52b. A raster control signal from the raster controller 40 is supplied to the line memories 51a and 51b and the MTI filters 52a and 52b. An output from the autocorrelation calculation circuit 54 is supplied to a mean velocity calculation circuit 56, a variance calculation circuit 58, and a power calculation circuit 60. Outputs from the calculation circuits 56, 58, and 60 are supplied to the DSC 26. The MTI filters 52a and 52b serve to remove unwanted reflected waves (clutter components) from a stationary reflecting object (e.g., the wall of the blood vessel or of the heart) and are constituted by digital low-pass filters. The sampling timing of each digital low-pass filter is controlled by the raster control signal. In this case, each MTI filter may be constituted by a delay line and a subtracter as an analog filter for removing clutter components by subtracting reflection signal components from each reflection signal having a lapse of a predetermined period of time. Outputs from the mean velocity calculation circuit 56, the variance calculation circuit 58, and the power calculation circuit 60 are supplied to the DSC 26. Subsequently, in a color processing circuit 42, similar to a conventional apparatus, a color Doppler image is displayed in such a manner that a direction toward the probe 10 and a direction from the probe 10 are respectively represented by red and blue, a mean velocity is represented by the saturation of a color, and a rate variance is represented by hue (mixing of green).

Referring to FIG. 1 again, an output from the DSC 26 is supplied to the display 46 through the color processing circuit 42 and a D/A converter 44. An output from the D/A converter 44 may be supplied to a recording section such as a VTR although it is not shown.

Figure 3:
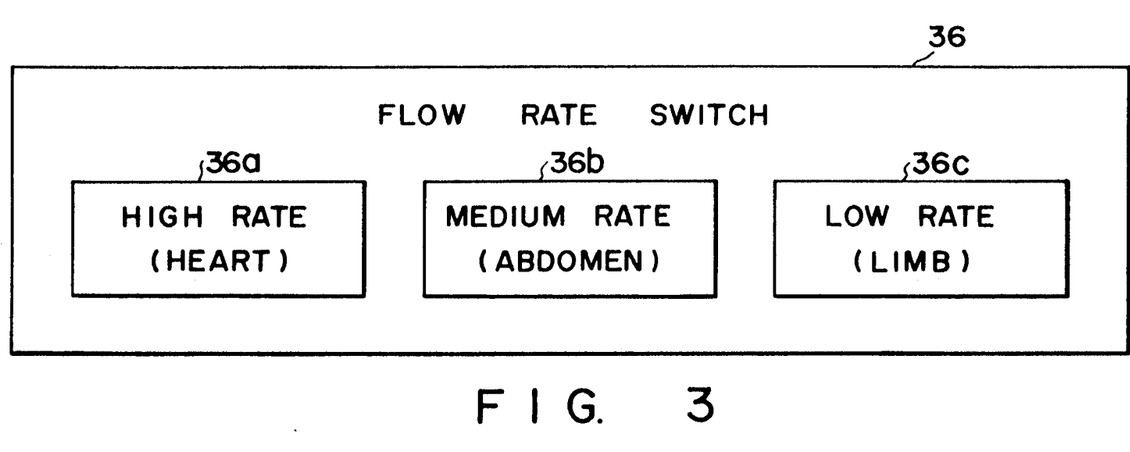
FIG. 3 is a view showing a flow rate switch in FIG. 1.

A flow rate switch 36 is connected to the raster controller 40. The flow rate switch 36 serves to input an approximate flow rate at a portion to be diagnosed of an object to be examined as a parameter for changing a raster control mode. FIG. 3 shows the flow rate switch 36. The flow rate switch 36 is formed of a plurality of switches arranged in units of flow rate ranges, three switches in this case, namely a high rate switch 36a, a medium rate switch 36b, and a low rate switch 36c. In this case, the medium rate switch 36b is for the abdomen and corresponds to a flow rate range of 10 to 30 cm/s. Flow rates higher than this flow rate range correspond to the high rate switch 36a (for the heart). Flow rates lower than this flow rate range correspond to the low rate switch 36c (for the limb).

Figure 4:
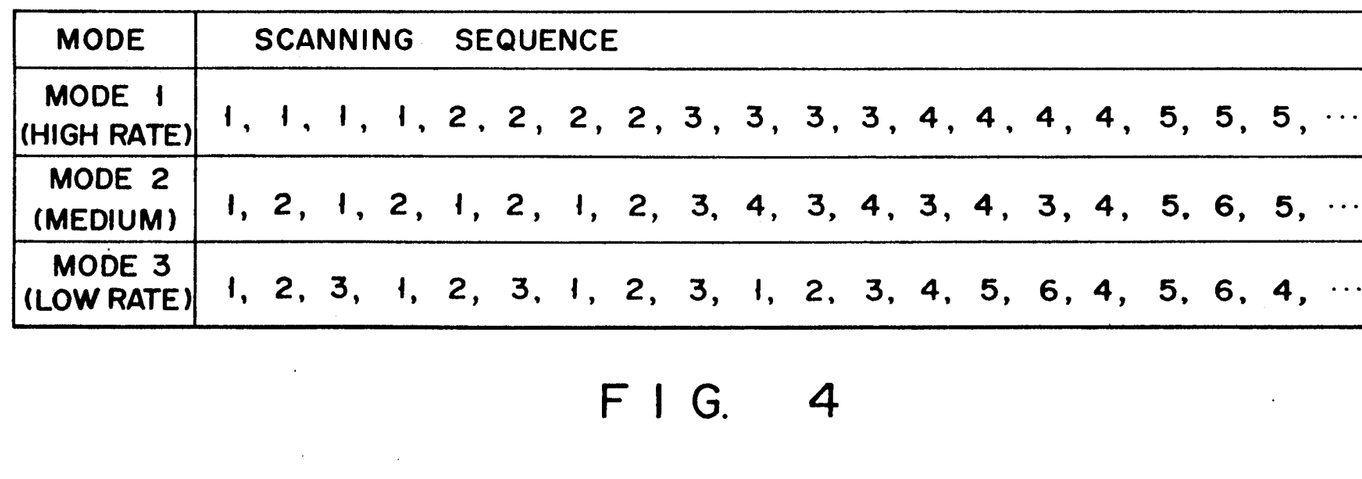
FIG. 4 is a view showing a scanning sequence of ultrasonic radiation directions in each operation mode in the first embodiment.

An operation of the first embodiment will be described below. In order to obtain a BDF image, an ultrasonic wave must be radiated in each raster direction a predetermined number of times n, e.g., n=4, and scanning must be performed in the respective raster direction, i.e., raster 1 to raster m. In the embodiment, the raster controller 40 controls a radiation direction for each radiation of an ultrasonic wave as follows. Note that in this embodiment raster control modes are switched in response to a designation from the flow rate switch 36 so as to always set a sampling frequency associated with the detection performance of a Doppler shift frequency to be an optimal frequency in accordance with a target portion of interest. As shown in FIG. 4, when the high rate switch 36a is depressed, mode 1 is selected. When the medium rate switch 36b is depressed, mode 2 is selected. When the low rate switch 36c is depressed, mode 3 is selected.

Mode 1 is the simplest mode, in which when an ultrasonic wave is radiated in each raster direction four times, the raster direction is changed by one. That is, the sampling frequency equals to the rate frequency fr. In this mode, although the lower limit of detectable low flow rates is high, the upper limit is also is high. Therefore, mode 1 is suitable for diagnosis of a portion at which a flow rate is high, e.g., the heart.

Modes 2 and 3 similar to the mode described in the above-described U.S. patent application Ser. No. 07/423,713. In these modes, radiation directions are changed one by one for each radiation. When radiation directions are changed from the first direction to the ith (i=2 in mode 2; i=3 in mode 3) direction, radiation is performed in the first direction again. When radiation is performed four times in each radiation direction, radiation is performed in directions from an (i+1)th direction to a (2i)th direction in the same manner as described above. Subsequently, this operation is repeated. With this operation, the sampling frequency can be decreased to 1/(2fr) (in mode 2) and to 1/(3fr) (in mode 3). Accordingly, in modes 2 and 3, the lower limit of detectable flow rate can be decreased to ½ and ⅓ that in mode 1, respectively. In modes 2 and 3, the upper limit of detectable flow rate is also decreased with the decrease in lower limit. Therefore, modes 2 and 3 are not suitable for a portion at which a flow rate is high. Mode 2 is suitable for the abdomen. Mode 3 is suitable for the limb.

As described above, according to the present invention, by changing the sampling frequency for Doppler shift detection in accordance with an approximate range of flow rates at a target portion to be diagnosed, a proper detectable flow rate range can be set in accordance with the target portion. This allows detection of low flow rates, and prevents a portion near the wall of an organ in a BDF image from becoming white, and suppresses aliasing.

Figure 5:
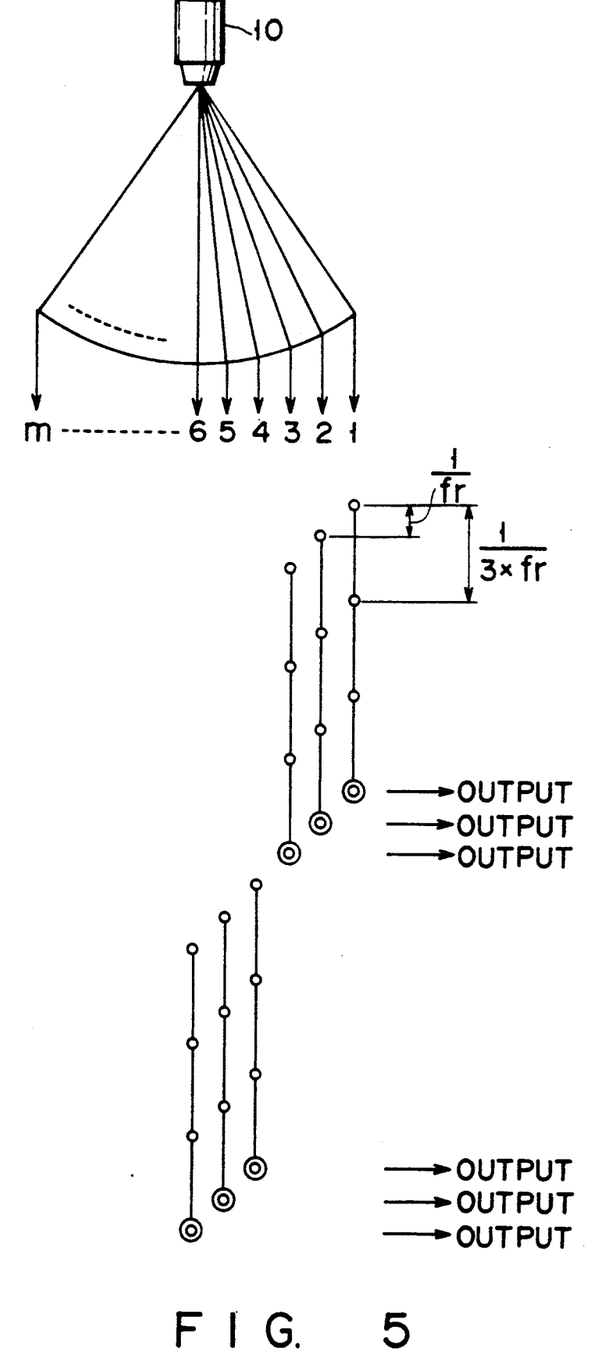
FIG. 5 is a view showing a detailed operation mode suitable for diagnosing an object having a low flow rate in the first embodiment.

Four pieces of data are output from the line memories 51a and 51b every time an ultrasonic wave is radiated four times in each radiation direction. In the modes shown in FIG. 4, the data output timings of the line memories 51a and 51b are not set at equal intervals. FIG. 5 shows data output timings in mode 3 as an example.

Figure 6:
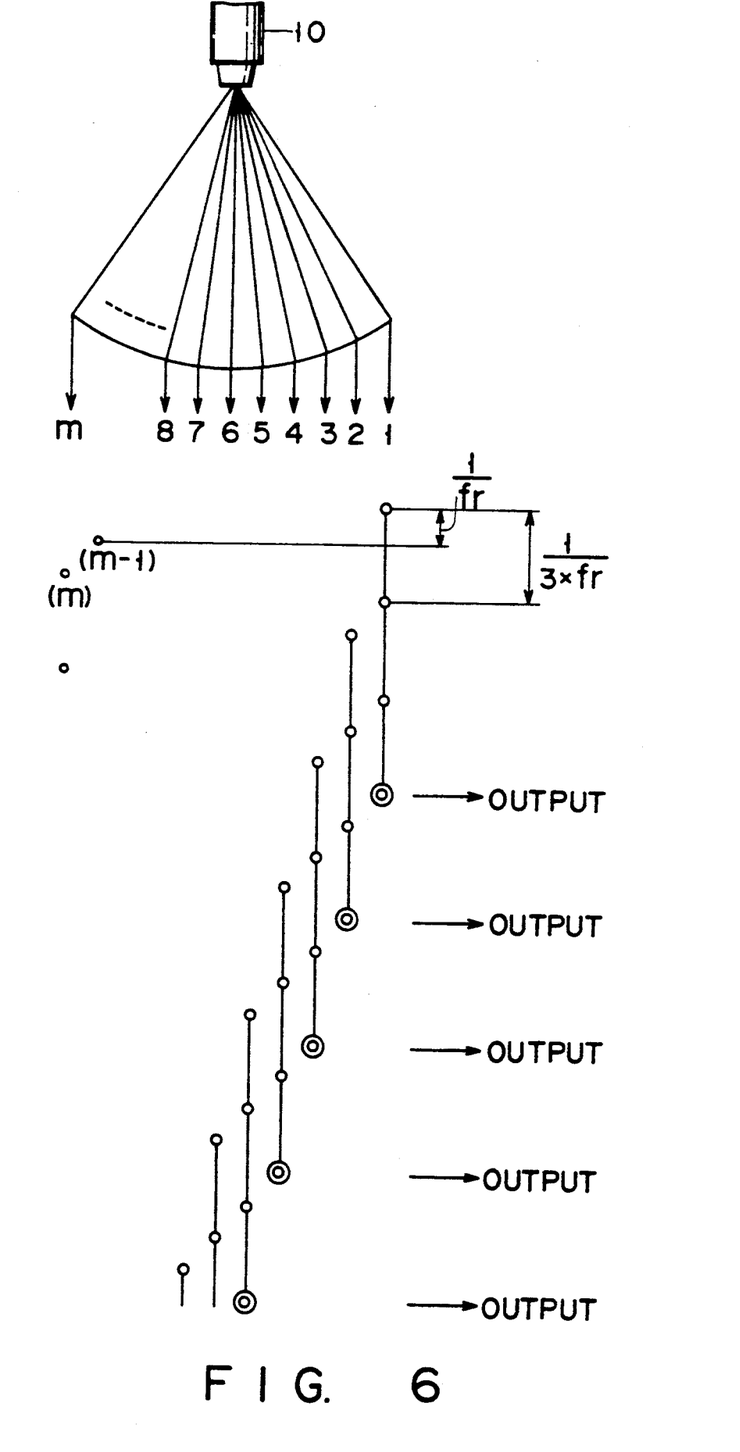
FIG. 6 is a view showing a modification of the operation mode in FIG. 5 in detail.

In order to set these data output timings at equal intervals, in mode 3, raster directions may be controlled, as shown in FIG. 6. More specifically, an ultrasonic Wave is radiated in each radiation direction once. At the same time, the radiation direction is sequentially changed by four directions, returned to the second direction, and sequentially changed by four directions. By repeating this operation, the fourth radiation of the ultrasonic wave in each direction is performed at equal intervals, and hence the data output timing from the line memories 51a and 51b are set at equal intervals. As a result, the data output timing can be easily controlled.

The present invention is not limited to the above-described embodiment. Various changes and modifications can be made within the spirit and scope of the invention. The flow rate switch may be designed to switch between three or more flow rate ranges. In accordance with this switching, the number of steps in a sequential scan may be set to be three or more.

As has been described above, according to the present invention, the sampling frequency for Doppler shift frequency detection can be changed in accordance with an approximate value of a flow rate range for each target portion to be diagnosed, and hence a flow rate detection range suitable for the target portion can be set, thereby providing an ultrasonic diagnosis apparatus which can detect flow rate data with an optimal resolution.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An ultrasonic diagnosis apparatus comprising:
   transducer means for radiating an ultrasonic wave to an object, and receiving an ultrasonic wave reflected by the object;
   scanning means for controlling said transducer means to change a radiation direction of the ultrasonic wave in such a manner that a given slice of the object is scanned by a plurality of ultrasonic waves while the ultrasonic waves are repeatedly radiated in a plurality of directions, each repetition being after the completion of a given number of radiations;
   means for detecting a Doppler shift frequency of the ultrasonic wave received by said transducer means, and obtaining flow rate data of a blood flow within the slice in accordance with the Doppler shift frequency; and
   control means, including a manual operating member for selecting an approximate flow rate of the blood flow within the slice, for controlling said scanning means in accordance with the selected flow rate and changing the given number of radiations to change a repetition interval at which the ultrasonic waves are repeatedly radiated in each radiation direction.

2. An apparatus according to claim 1, wherein said control means decreases the given number of radiations with an increase in designated flow rate.

3. An apparatus according to claim 1, wherein said manual operating member comprises two switches for designating low and high flow rate ranges, and said control means increases the given radiations upon designation of the low flow rate range and decreases the given number of radiations upon designation of the high flow rate range.

4. An apparatus according to claim 1, wherein said manual operating member comprises a plurality of switches for designating a portion of a slice to be scanned by the ultrasonic waves, and said control means decreases the given number of radiations with a decrease in distance between a designated portion and a heart.

5. An apparatus according to claim 1, wherein said scanning means comprises first scanning means for sequentially changing the direction of radiation and for radiating the ultrasonic waves a plurality of times in each radiation direction, and second scanning means for periodically changing from a first group of radiation directions to a second group of radiation directions, the number of radiation directions in each group being less than a total number of directions included in the slice, and said control means invokes said first scanning means when a designated flow rate is low, and invokes said second scanning means when a designated flow rate is high, the number of radiating directions increasing with a decrease in designated flow rate.

6. An apparatus according to claim 1, wherein said transducer means radiates the ultrasonic wave at a predetermined period, and said scanning means changes radiation directions such that corresponding radiations of the ultrasonic wave in each radiation direction are completed at equal intervals.

7. An apparatus according to claim 6, wherein said scanning means comprises first scanning means for sequentially changing the direction of radiation and for radiating the ultrasonic waves a plurality of times in each radiation direction, and second scanning means for sequentially changing a scanning pattern from a first group of radiating directions to a second group of radiating directions while radiating the ultrasonic wave once in each radiation direction, and said control means invokes said first scanning means when a designated flow rate is high, and invokes said second scanning means when the designated flow rate is low, the number of radiating directions increasing with a decrease in designated flow rate.

8. An apparatus according to claim 1, further comprising:
   means for obtaining a tomographic image of the slice by detecting an intensity of the ultrasonic waves received by said transducer means; and
   color mapping means for displaying in color a blood flow in the tomographic image in accordance with the Doppler shift frequency.

9. A method of controlling ultrasonic radiation in a plurality of directions in an ultrasonic diagnosis apparatus including transducer means for radiating an ultrasonic wave to an object at a predetermined period, and receiving an ultrasonic wave reflected by the object, means for obtaining a tomographic image of a given slice by detecting an intensity of the ultrasonic wave received by said transducer means, and color mapping means for detecting a Doppler shift frequency of the ultrasonic wave received by said transducer means and displaying in color a blood flow in the tomographic image in accordance with the Doppler shift frequency, said method comprising the steps of:

selecting an approximate flow rate of a blood flow within the slice by using a manual operating member;

controlling said transducer means in accordance with the selected flow rate and changing a radiation direction of the ultrasonic wave in such a manner that a given slice of the object is scanned by the ultrasonic wave while the ultrasonic wave is repeatedly radiated in each direction a plurality of times, each repetition being after the completion of a given number of radiations; and changing a sampling frequency of data input to said color mapping means in accordance with the designated flow rate.

10. A method according to claim 9, wherein the given number of radiations is decreased as the designated flow rate is increased.

11. A method according to claim 9, wherein said manual operating member designates a flow rate by using at least two switches for respectively designating low and high flow rate ranges.

12. A method according to claim 9, wherein said manual operating member designates a flow rate by using a plurality of switches, each switch representing a portion of the slice.

* * * * *

UNITED STATES PATENT AND TRADEMARK OFFICE
CERTIFICATE OF CORRECTION

PATENT NO. : 5,078,146
DATED : January 07, 1992
INVENTOR(S) : Ichiro Sato

It is certified that error appears in the above-identified patent and that said Letters Patent is hereby corrected as shown below:

Abstract, line 5, change "ultra-sonic" to --ultrasonic--.

Abstract, line 17, after "for" Delete "a".

Signed and Sealed this

Twenty-second Day of June, 1993

Attest:

MICHAEL K. KIRK

Attesting Officer    Acting Commissioner of Patents and Trademarks